(12) United States Patent
Tashiro

(10) Patent No.: US 8,669,937 B2
(45) Date of Patent: Mar. 11, 2014

(54) INFORMATION PROCESSING APPARATUS AND COMPUTER-READABLE MEDIUM

(75) Inventor: Kiyoshi Tashiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 478 days.

(21) Appl. No.: 13/005,590

(22) Filed: Jan. 13, 2011

(65) Prior Publication Data

US 2012/0068923 A1 Mar. 22, 2012

(30) Foreign Application Priority Data

Sep. 17, 2010 (JP) ................................. 2010-208771

(51) Int. Cl.
*G09G 5/08* (2006.01)

(52) U.S. Cl.
USPC ........... 345/157; 345/156; 345/160; 345/167; 715/856

(58) Field of Classification Search
USPC ........................... 345/156–169; 715/856–858
See application file for complete search history.

(56) References Cited

U.S. PATENT DOCUMENTS

| 6,115,025 A | * | 9/2000 | Buxton et al. ................. 345/659 |
| 6,567,068 B2 | * | 5/2003 | Rekimoto ..................... 345/156 |
| 2002/0093483 A1 | * | 7/2002 | Kaplan ......................... 345/158 |

FOREIGN PATENT DOCUMENTS

| JP | 10-161619 A | 6/1998 |
| JP | 2001-242845 A | 9/2001 |
| JP | 2003-058316 A | 2/2003 |
| JP | 2008-140064 A | 6/2008 |
| JP | 2009-251833 A | 10/2009 |

\* cited by examiner

*Primary Examiner* — Jennifer Nguyen
(74) *Attorney, Agent, or Firm* — Sughrue Mion, PLLC

(57) ABSTRACT

An information processing apparatus includes a first acceptance unit, a second acceptance unit and a coordinate determination unit. The first acceptance unit accepts first inclinations or first accelerations of a portable information processing apparatus having a display screen in a first state. The second acceptance unit accepts second inclinations or second accelerations of the information processing apparatus in a second state. The coordinate determination unit determines coordinates of a mark for pointing to a position on the display screen in the second state based on the first inclinations accepted by the first acceptance unit and the second inclinations accepted by the second acceptance unit or based on the first accelerations accepted by the first acceptance unit and the second accelerations accepted by the second acceptance unit.

9 Claims, 14 Drawing Sheets

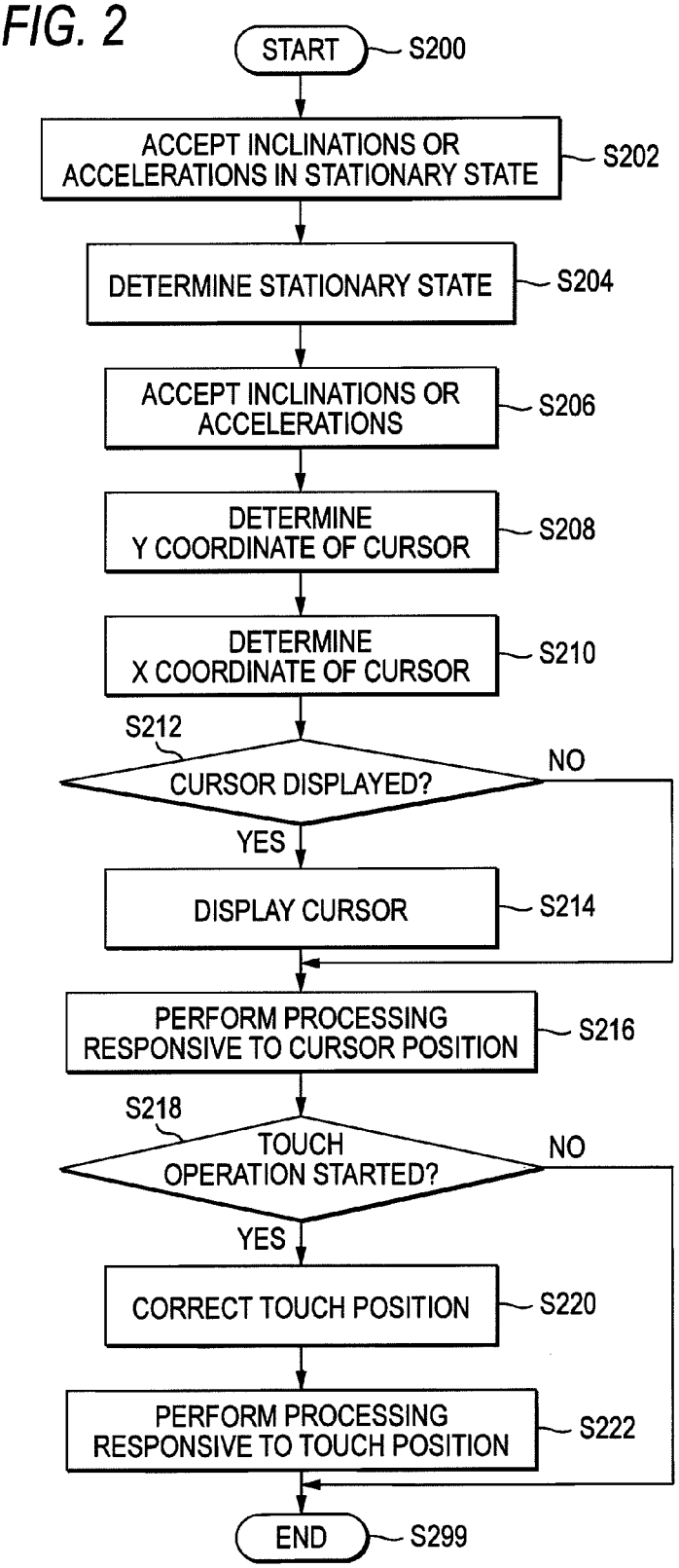

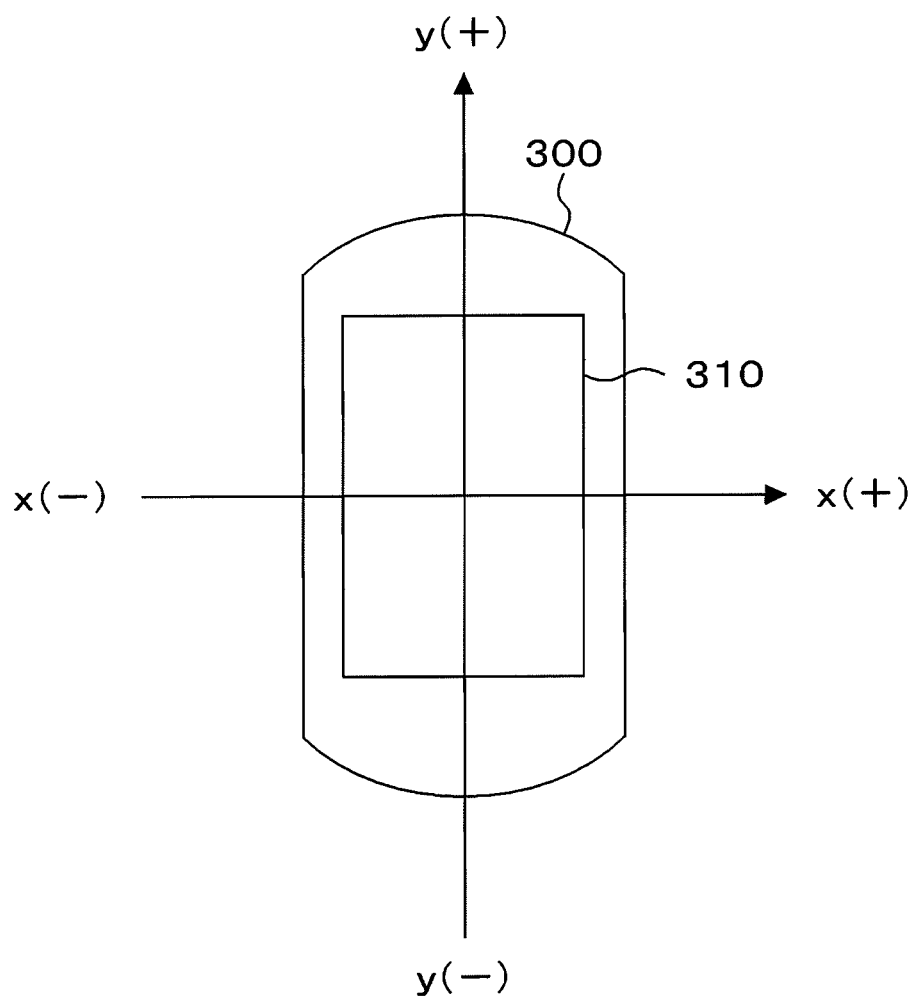

INFORMATION PROCESSING APPARATUS AND COMPUTER-READABLE MEDIUM

CROSS-REFERENCE TO RELATED APPLICATION

This application is based on and claims priority under 35 USC 119 from Japanese Patent Application No. 2010-208771 filed on Sep. 17, 2010.

BACKGROUND

Technical Field

This invention relates to an information processing apparatus and a computer-readable medium.

SUMMARY

According to an aspect of the invention, an information processing apparatus includes a first acceptance unit, a second acceptance unit and a coordinate determination unit. The first acceptance unit accepts first inclinations or first accelerations of a portable information processing apparatus having a display screen in a first state. The second acceptance unit accepts second inclinations or second accelerations of the information processing apparatus in a second state. The coordinate determination unit determines coordinates of a mark for pointing to a position on the display screen in the second state based on the first inclinations accepted by the first acceptance unit and the second inclinations accepted by the second acceptance unit or based on the first accelerations accepted by the first acceptance unit and the second accelerations accepted by the second acceptance unit.

BRIEF DESCRIPTION OF THE DRAWINGS

Exemplary embodiments of the invention will be described in detail based on the following figures, wherein:

FIG. 2 is a flowchart to show a processing example according to the first embodiment of the invention;

FIG. 6 is a schematic representation to show an example of coordinates in a display screen;

DETAILED DESCRIPTION

First, for easy understanding of the description of an embodiment, a general operation interface using a touch panel will be discussed.

In the operation interface using the touch panel, various restrictions occur because a finger, a pen, etc., touches on the touch panel and the touch position is detected.

For example, in a mouse operation interface of a personal computer (PC), operation of moving only the position of a cursor on a screen; in a touch panel operation interface, operation involving no click cannot be detected.

For example, in viewing a home page with a web browser, etc., the provider of the home page cannot necessarily determine an operation interface on the viewing side. If the operation interface can be determined, it is disadvantageous in the cost of creation and maintenance to provide a different operation method for each of the operation interfaces. If different operation methods in mouse operation and touch panel operation are provided, the operator need learn each operation method.

In many conventional touch panel operation interfaces, operation of touching one part on a touch panel for a short time is made to correspond to click of a mouse button. Operation of starting touch in one part on the touch panel and moving to a different part with the touch held is made to correspond to operation of moving a mouse with a mouse button pressed in mouse operation (mouse drag).

However, operation of moving a mouse without pressing a mouse button and moving a cursor on a screen to a specific position is not realized in many touch panel operation interfaces. In home pages and software intended mainly for mouse operation, for example, if moving of a mouse cursor to an area representing a specific button is detected, the display method of the button is changed for enhancing that the button can be clicked and description of the button is temporarily displayed, thereby improving convenience of the user. However, in the touch panel operation interface, such processing cannot be performed because a cursor cannot be moved without touching the touch panel.

Further, in the mouse operation interface, after the cursor position is checked on the screen, click can be performed; whereas, in click operation on a touch panel, the touch position is not detected until touch is performed and thus the operator cannot predict a detailed clock position and may perform erroneous operation. Particularly in touch operation with a finger, the screen touch position may differ from the position assumed by the operator depending on the angle of the finger and it may become difficult to perform operation of specifying a detailed position.

Figure 1:
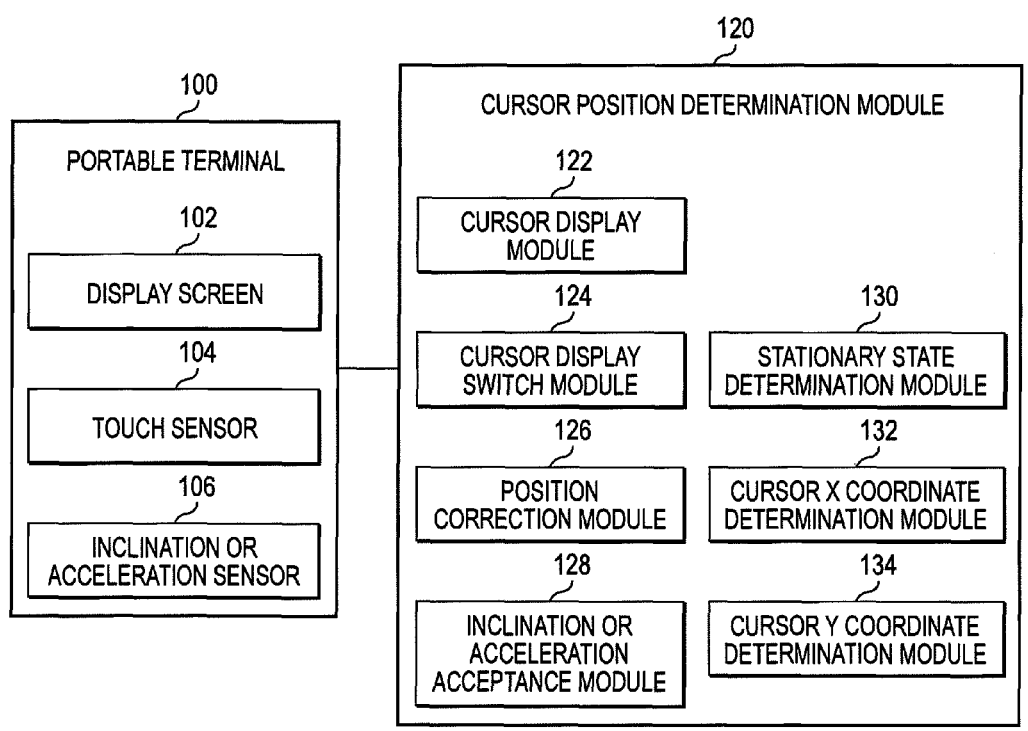
FIG. 1 is a conceptual module block diagram about a configuration example of a first embodiment of the invention.

Preferred embodiments for realizing the invention will be discussed below based on the accompanying drawings:

FIG. 1 is a conceptual module block diagram about a configuration example of a first embodiment of the invention.

A module refers to a generally and logically detachable component of software (computer program), hardware, etc. Therefore, the module in the embodiments means not only a module in a computer program, but also a module in the hardware configuration. Therefore, the embodiments also serve as the description of a computer program (program for causing a computer to execute steps, program for causing a computer to function as means, program for causing a computer to realize functions), a system, and a method for functioning as the modules. For the convenience of the description, "store" and its equivalent word are used, however, if the embodiment is a computer program, the words are used to mean storing in storage or controlling so as to store in storage. Modules may be in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. One module may contain any other module. In the description to follow, the term "connection" is used to mean not only physical connection, but also logical connection (data transfer, command, reference relationship between data pieces, etc.,). The term "predetermined" refers to determined before target processing and is used to mean not only determined before start of processing according to embodiment, but also determined in response to the situation or the state at the time or the situation or the state so far if the time is before the target processing even if the time is after the processing according to embodiment is started.

The system or apparatus is not only provided by connecting a plurality of computers, hardware devices, units, etc., by communication means such as a network (containing peer-to-peer communication connection), etc., but also implemented as one computer, hardware device, apparatus, etc. The "apparatus" and the "system" are used as synonyms. The "system" does not contain a social "mechanism" of artificial arrangement, of course.

Target information is read from storage for each processing by each module or for each processing if a plurality of types of processing are performed in a module and after the processing is performed, the processing result is written to storage. Therefore, description of read from storage before processing and write to storage after processing may be omitted. The storage may contain hard disk, RAM (Random Access Memory), an external storage medium, storage through a communication line, a register in a CPU (Central Processing Unit), etc.

An information processing apparatus of the first embodiment is a portable information processing apparatus having a display screen and has a portable terminal 100 and a cursor position determination module 120 as shown in an example in FIG. 1. The portable terminal 100 and the cursor position determination module 120 are connected. The portable terminal 100 and the cursor position determination module 120 may exist in the same cabinet or may exist in separate cabinets.

The portable terminal 100 has a display screen 102, a touch sensor 104, and an inclination or acceleration sensor 106. The portable terminal 100 is portable. The term "portable" is used to mean a mode in which an operator can perform operation of inclining, rotating, shaking, etc., the portable terminal 100. The operation also contains operation on the display screen 102 integral with the touch sensor 104 performed by the operator.

Figure 3A:
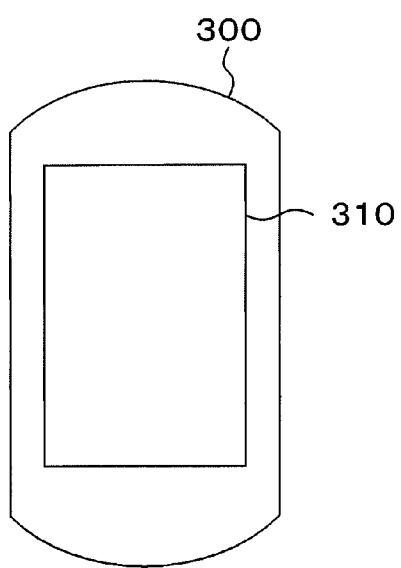
FIGS. 3A and 3B are schematic representations to show an appearance example of a portable information processing apparatus.
Figure 3B:
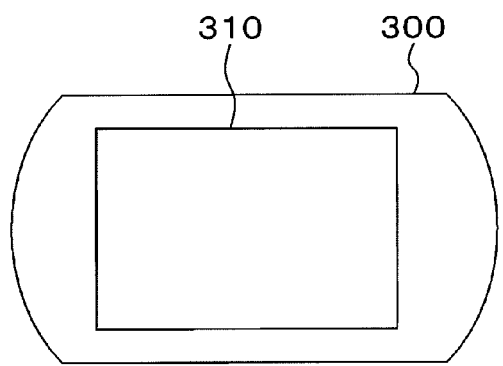

FIG. 3 is a schematic representation to show an appearance example of a portable information processing apparatus 300. The portable information processing apparatus 300 has a display screen 310 of a touch panel. The portable information processing apparatus 300 has the portable terminal 100 illustrated in FIG. 1 and the display screen 310 corresponds to the display screen 102 of the portable terminal 100. The portable information processing apparatus 300 illustrated in FIG. 3A is placement in a portrait use mode and the portable information processing apparatus 300 illustrated in FIG. 3B is placement in a landscape use mode. The portable information processing apparatus 300 may be used in either placement. One portable information processing apparatus 300 may be switched to either placement illustrated in FIG. 3A or FIG. 3B.

The cursor position determination module 120 may be implemented as a part of OS operating in the portable information processing apparatus 300 and may send position information of a cursor to be displayed by a cursor display module 122 to each application operating in the OS.

The cursor position determination module 120 may be implemented as a part of application operating in the portable information processing apparatus 300.

The cursor position determination module 120 may exist in information processing apparatus connected to the portable information processing apparatus 300 through a communication line.

Figure 4:
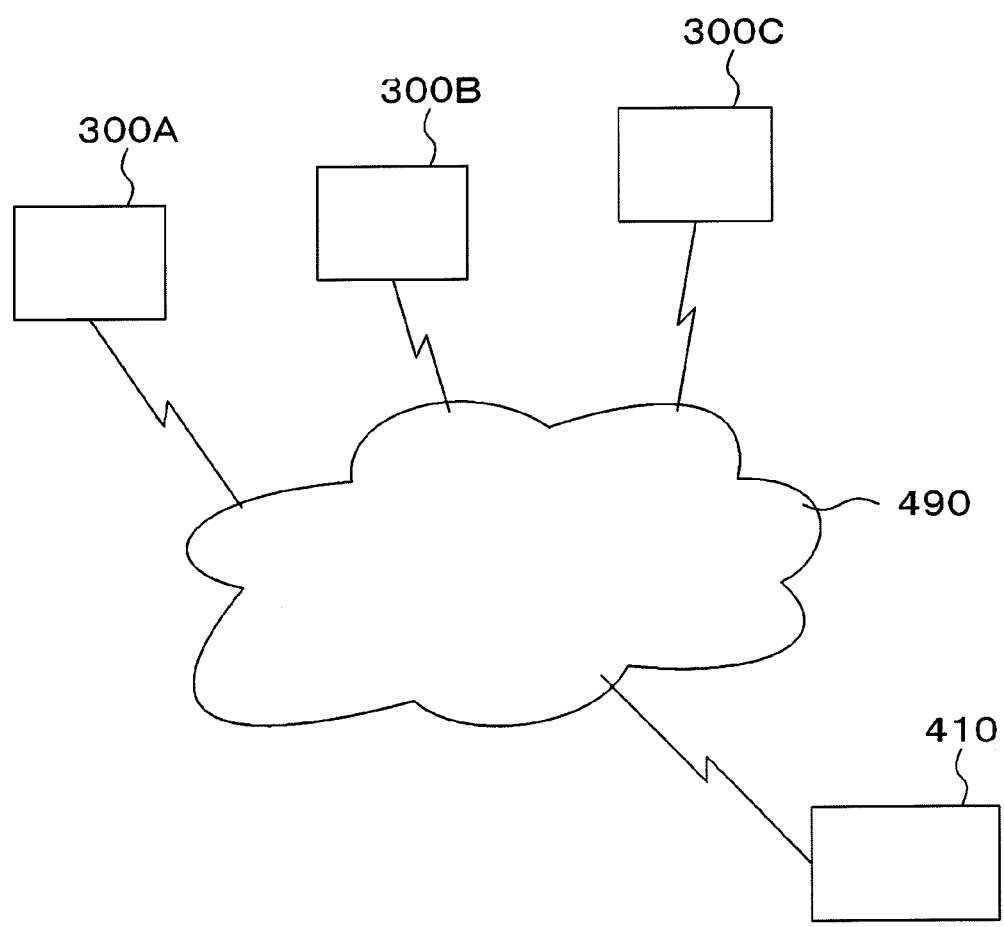
FIG. 4 is a schematic representation to show a system configuration example when the embodiment of the invention is realized.

Software for realizing the cursor position determination module 120 may be acquired from a server via a network of a communication line and may be executed in the portable information processing apparatus 300. FIG. 4 is a schematic representation to show a system configuration example when the embodiment of the invention is realized. A portable information processing apparatus 300A, a portable information processing apparatus 300B, a portable information processing apparatus 300C, and a Web server 410 are connected through a communication line 490. In such a configuration, software for realizing the cursor position determination module 120 is provided, for example, as JavaScript (registered trademark) and when a Web page represented in HTML, etc., is viewed with browser software in the Web server 410, JavaScript is operated, whereby the cursor position determination module 120 can be realized.

The display screen 102 in the portable terminal 100 is a liquid crystal display, etc., and can display a character, a pattern, an image, a moving image, etc.

The touch sensor 104 in the portable terminal 100 accepts the position of operation of the display screen 102 performed by the operator. The touch sensor 104 is integral with the display screen 102 and is a device for the operator to perform operation by touching display (a menu, etc.,) on the display screen 102 with a finger, a pen, etc. Generally, the display screen 102 integral with the touch sensor 104 is also called a touch panel, a touch screen, etc., (hereinafter, also called simply a touch panel). The touch sensor 104 detects a touch position of a finger, a pen, etc. The touch sensor 104 can be realized by a resistance film system, an electrostatic capacity system, a surface acoustic wave system, an infrared system, etc. In the description given above, the touch position of the display screen 102 is detected; however, for example, if the infrared system is adopted, a position where infrared radiation is blocked is detected. However, the position of infrared detection is brought into intimate contact with the surface of the display screen 102, whereby detection of a position where infrared radiation is blocked becomes the same as detection of a touch position and therefore hereinafter the expression "the touch position of the display screen 102 is detected" will be used. As the display screen 102 integral with the touch sensor 104 exists, connection of a device of a mouse, etc., is not required, but connection of a device of a mouse, etc., is not necessarily inhibited.

Figure 5:
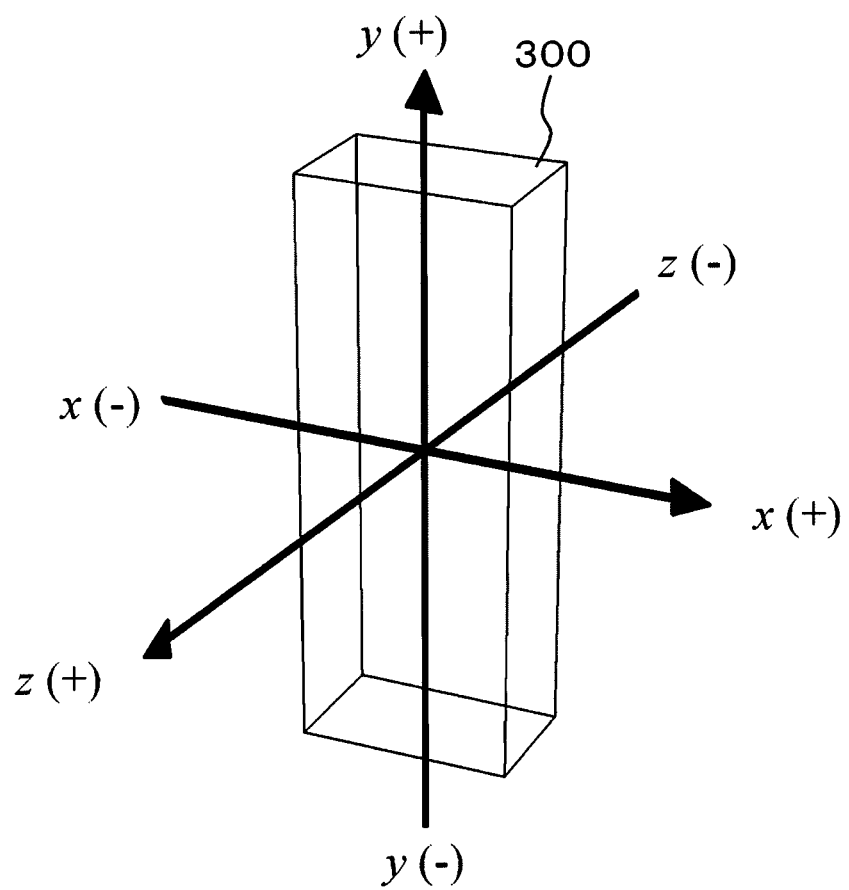
FIG. 5 is a schematic representation to show an example of xyz space.

The inclination or acceleration sensor 106 in the portable terminal 100 is a device for detecting inclination or acceleration of the portable terminal 100. It can be realized by a gyro sensor, an acceleration sensor, a magnetic sensor, etc. For example, if a three-axis acceleration sensor is included, the acceleration is detected as a three-dimensional vector. FIG. 5 illustrates an xyz space in the portable information processing apparatus 300 (containing the portable terminal 100 in FIG. 1). That is, an x axis indicates the left-right direction, a y axis indicates the up and down direction, and a z axis indicates the front and back direction. The inclination or acceleration sensor 106 is placed along the x axis, the y axis, and the z axis illustrated in FIG. 5 and the acceleration value observed in each sensor is described as x, y, z component of the acceleration vector.

It is assumed that the two-dimensional display screen 102 included in the portable information processing apparatus 300 is installed in parallel with a plane (xy plane) produced by the x axis and the y axis illustrated in FIG. 5, and as the description of the coordinates in the display screen 102, the x axis and the y axis illustrated in FIG. 5 are used in common containing signs. For example, as shown in FIG. 6, a coordinate system in the display screen 310 (corresponding to the display screen 102 in FIG. 1) is determined. It is assumed that the direction of the line of sight of the operator is from the positive direction of the z axis. Therefore, the positive direction of the x axis becomes the right direction for the operator and the negative direction of the x axis becomes the left direction for the operator.

When the portable information processing apparatus 300 is almost still or moves at constant speed, the acceleration applied to the portable information processing apparatus 300 is gravity acceleration only and the orientation of the acceleration vector detected by the inclination or acceleration sensor 106 is the orientation of the gravity. The inclination of the portable information processing apparatus 300 is found relatively from the orientation of the gravity.

The cursor position determination module 120 has the cursor display module 122, a cursor display switch module 124, a position correction module 126, an inclination or acceleration acceptance module 128, a stationary state determination module 130, a cursor x coordinate determination module 132, and a cursor y coordinate determination module 134.

The inclination or acceleration acceptance module 128 accepts inclination or acceleration of the portable terminal 100 in a first state. It accepts inclination or acceleration of the portable terminal 100 in a second state. The inclination or acceleration of the portable terminal 100 is detected by the inclination or acceleration sensor 106 and is accepted.

The first state (hereinafter, also called stationary state) refers to, for example, a state in which the fluctuation amount of inclination or acceleration detected within a predetermined time is within a predetermined range, a state in which the touch sensor 104 detects the most recent touch of the display screen 102 (touch operation) is detected, a state in which a stationary state is specified by operation of the operator, a state in which power of the portable terminal 100 is turned on, or the like.

The second state (hereinafter also called cursor position determination state) refers to a state in which the position of the cursor should be determined. Since the position of the cursor is determined after the stationary state is determined, the second state is after the inclination or the acceleration of the portable terminal 100 in the first state is accepted. The cursor refers to a mark for pointing to a position on the display screen 102 (generally, an image shaped like an arrow, etc.,). However, the cursor need not always be displayed on the display screen 102 and may exist potentially. When the cursor exists potentially, the position of the cursor may be determined by the cursor x coordinate determination module 132 and the cursor y coordinate determination module 134 or may be fixed to the position of the cursor before the cursor exists potentially.

The inclination or the acceleration of the portable terminal 100 accepted by the inclination or acceleration acceptance module 128 may be a value in each of the x axis, the y axis, and the z axis in the portable terminal 100.

The stationary state determination module 130 determines the inclination or the acceleration of the portable terminal 100 in the stationary state based on the inclination or the acceleration of the portable terminal 100 in the stationary state accepted by the inclination or acceleration acceptance module 128. For example, the inclination of the portable terminal 100 is the orientation of the portable terminal 100 to the gravity direction. When the stationary state is the state in which the fluctuation amount of inclination or acceleration detected within a predetermined time is within a predetermined range, the statistical value (for example, average value, mode, center value, etc.,) of the inclination or the acceleration of the portable terminal 100 within the time is the inclination or the acceleration of the portable terminal 100 in the stationary state. When the stationary state is the state in which the touch sensor 104 detects the most recent touch of the display screen 102 is detected, the state in which the stationary state is specified by operation of the operator, the state in which power of the portable terminal 100 is turned on, or the like, the inclination or the acceleration of the portable terminal 100 accepted by the inclination or acceleration acceptance module 128 in the state is the inclination or the acceleration of the portable terminal 100 in the stationary state.

The cursor x coordinate determination module 132 and the cursor y coordinate determination module 134 determine the position of the cursor on the display screen 102 in response to the change amount of the inclination or the acceleration in the stationary state and the cursor position determination state.

The cursor x coordinate determination module 132 determines the x coordinate of the cursor in the cursor position determination state based on the inclination or the acceleration of the portable terminal 100 in the stationary state determined by the stationary state determination module 130 and the inclination or the acceleration of the portable terminal 100 in the cursor position determination state accepted by the inclination or acceleration acceptance module 128.

The cursor x coordinate determination module 132 determines the coordinate in the left-right direction on the display screen 102 (x coordinate) based on the angle difference between projection onto the xy plane, of the inclination or the acceleration in the stationary state and projection onto the xy plane, of the inclination or the acceleration in the cursor position determination state and the angle difference between projection onto the xz plane, of the inclination or the acceleration in the stationary state and projection onto the xz plane, of the inclination or the acceleration in the cursor position determination state.

Further, the cursor x coordinate determination module 132 may compare the size of projection onto the xy plane, of the inclination or the acceleration in the stationary state or the size of projection onto the xy plane, of the inclination or the acceleration in the cursor position determination state with a predetermined threshold value. If they have a predetermined relationship, the cursor x coordinate determination module 132 may determine the coordinate in the left-right direction on the display screen 102 (x coordinate) based on the angle difference between projection onto the xz plane, of the inclination or the acceleration in the stationary state and projection onto the xz plane, of the inclination or the acceleration in the cursor position determination state. The expression "predetermined relationship" refers to the relationship in which the size of projection onto the xy plane, of the inclination or the acceleration in the stationary state or the size of projection onto the xy plane, of the inclination or the acceleration in the cursor position determination state is equal to or smaller than the predetermined threshold value.

Further, the cursor x coordinate determination module 132 may compare the size of projection onto the xz plane, of the inclination or the acceleration in the stationary state or the size of projection onto the xz plane, of the inclination or the acceleration in the cursor position determination state with a predetermined threshold value. If they have a predetermined relationship, the cursor x coordinate determination module 132 may determine the coordinate in the left-right direction on the display screen 102 (x coordinate) based on the angle difference between projection onto the xy plane, of the inclination or the acceleration in the stationary state and projection onto the xy plane, of the inclination or the acceleration in the cursor position determination state. The expression "predetermined relationship" refers to the relationship in which the size of projection onto the xz plane, of the inclination or the acceleration in the stationary state or the size of projection onto the xz plane, of the inclination or the acceleration in the cursor position determination state is equal to or smaller than the predetermined threshold value.

The cursor y coordinate determination module 134 determines the y coordinate of the cursor in the cursor position determination state based on the inclination or the acceleration of the portable terminal 100 in the stationary state determined by the stationary state determination module 130 and the inclination or the acceleration of the portable terminal 100 in the cursor position determination state accepted by the inclination or acceleration acceptance module 128.

For example, the cursor y coordinate determination module 134 determines the coordinate in the up and down direction on the display screen 102 (y coordinate) based on the angle difference between projection onto the yz plane, of the inclination or the acceleration in the stationary state and projection onto the yz plane, of the inclination or the acceleration in the cursor position determination state.

The cursor display module 122 displays a cursor at the position on the display screen 102 indicated by the x coordinate determined by the cursor x coordinate determination module 132 and the y coordinate determined by the cursor y coordinate determination module 134.

The cursor display switch module 124 switches display and non-display of the cursor by the cursor display module 122 based on the position of the cursor and operation of the operator. For example, the expression "based on the position of the cursor" is used to mean that when the cursor moves to the inside of a predetermined range, the cursor is switched to the non-display state. The expression "based on operation of the operator" is used to mean that when the operator touches the display screen 102 or inclines, etc., the portable terminal 100, the cursor is switched to the display state.

The position correction module 126 compares the distance between the position accepted by the touch sensor 104 and the position determined by the cursor x coordinate determination module 132 and the cursor y coordinate determination module 134 with a predetermined threshold value and changes the position accepted by the touch sensor 104 and the position determined by the cursor x coordinate determination module 132 and the cursor y coordinate determination module 134. For example, if the touch position of the operator (or position assumed to touch) and the position of the cursor differ because of visual sense difference, etc., the difference is decreased. More specifically, (1) the position accepted by the touch sensor 104 may be changed to the position determined by the cursor x coordinate determination module 132 and the cursor y coordinate determination module 134, (2) the position determined by the cursor x coordinate determination module 132 and the cursor y coordinate determination module 134 may be changed to the position accepted by the touch sensor 104, (3) either or both of the position accepted by the touch sensor 104 and the position determined by the cursor x coordinate determination module 132 and the cursor y coordinate determination module 134 may be changed using both the positions (for example, changed to an intermediate position of the line connecting both the positions (the intermediate position is not necessarily the position of ½ of both the positions; for example, may be the position of ¾ close to the position accepted by the touch sensor 104, etc.,).

FIG. 2 is a flowchart to show a processing example according to a first embodiment of the invention.

At step S202, the inclination or acceleration acceptance module 128 accepts inclination or acceleration in the stationary state detected by the inclination or acceleration sensor 106.

At step S204, the stationary state determination module 130 determines the inclination or the acceleration in the stationary state based on the inclination or the acceleration accepted at step S202. For example, a gravity acceleration vector in the stationary state is (Sx, Sy, Sz).

At step S206, the inclination or acceleration acceptance module 128 accepts inclination or acceleration in the cursor position determination state detected by the inclination or acceleration sensor 106. For example, a gravity acceleration vector in the cursor position determination state is (Tx, Ty, Tz).

At step S208, the cursor y coordinate determination module 134 determines the y coordinate of the cursor.

In more detail, the angle between projection of the gravity acceleration vector (Sx, Sy, Sz) onto the yz plane and the positive orientation of the z axis is found as A1$s$. The angle between projection of the gravity acceleration vector (Tx, Ty, Tz) onto the yz plane and the positive orientation of the z axis is found as A1$t$. Here, positive and negative of the angle are defined so that the angle from the z axis positive direction to the y axis negative direction becomes positive 90 degrees.

Position Cy of the cursor on the display screen in the y axis direction is found as $$Cy = M1 \times (A1t - A1s) + P1 \qquad \text{Expression (1)}$$

If the position of the cursor is thus found, when the coefficient M1 is a positive value, if the operator inclines the upper part of the portable information processing apparatus 300 away from the operator, the cursor moves upward; if the operator inclines the apparatus in an opposite orientation, the cursor moves downward.

If the correspondence between the inclination of the portable information processing apparatus 300 and the move direction of the cursor is made opposite depending on the favorite of the operator, etc., the value of the coefficient M1 may be made negative. The magnitude of the absolute value of the coefficient M1 determined how much the cursor moves if how much the apparatus is inclined (At changes). If M1 is large, when the apparatus is slightly inclined, the cursor moves large; it is preferable for largely moving the cursor on the screen, but is disadvantageous for slight cursor position adjustment. If M1 is small, when the apparatus is largely inclined, the cursor moves slightly; it is preferable for fine adjustment of the cursor position, but is disadvantageous for largely moving the cursor. The value of M1 may be uniquely determined as the portable information processing apparatus 300, may be changed in response to setting of the operator, or may be changed dynamically in response to the operation being performed.

The coefficient P1 has the effect of giving a predetermined offset regardless of an inclination change and indicates the y axis position of the cursor when A1$t$ equals A1$s$. As an example of the value of P1, the y axis position of the cursor at the stationary time, the y coordinate value of the touch position in the most recent touch operation, or the y coordinate value corresponding to the center in the y axis direction of the display screen (origin position in FIG. 8).

Figure 7A:
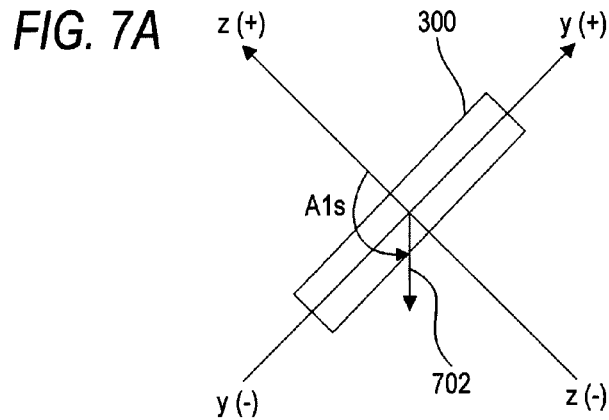
FIGS. 7A, 7B and 7C are schematic representations to show an example of inclination of the portable information processing apparatus in yz plane.
Figure 7B:
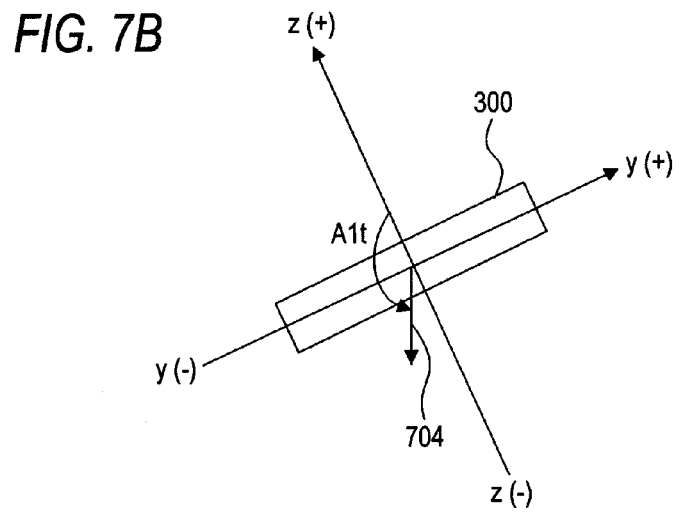
Figure 7C:
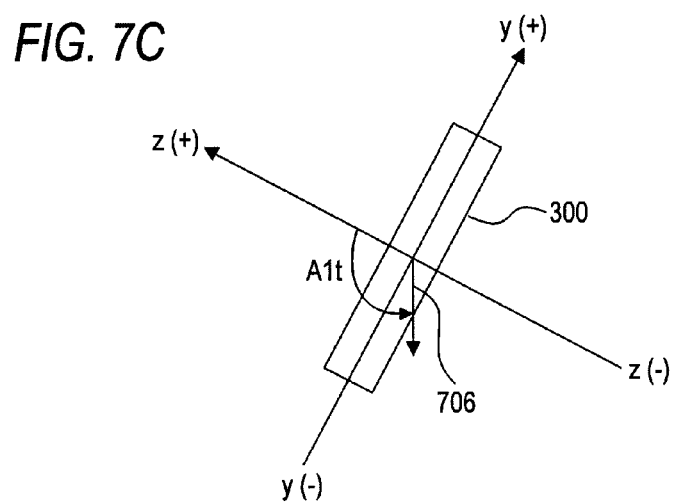

FIGS. 7A to 7C are schematic representations to show an example of inclination of the portable information processing apparatus 300 in the yz plane. FIG. 7A shows an example of the portable information processing apparatus 300 in the stationary state. It represents A1$s$ of the angle between projection 702 of the gravity acceleration vector (Sx, Sy, Sz) in the stationary state onto the yz plane and the positive orientation of the z axis. This is a state in which the portable information processing apparatus 300 is placed below eyes and the upper part of the portable information processing apparatus 300 is inclined upward (general state as the operation state of the portable information processing apparatus 300). The position of the cursor in the display screen 310 in this case is a cursor 802 at the origin as illustrated in FIG. 8.

Figure 8:
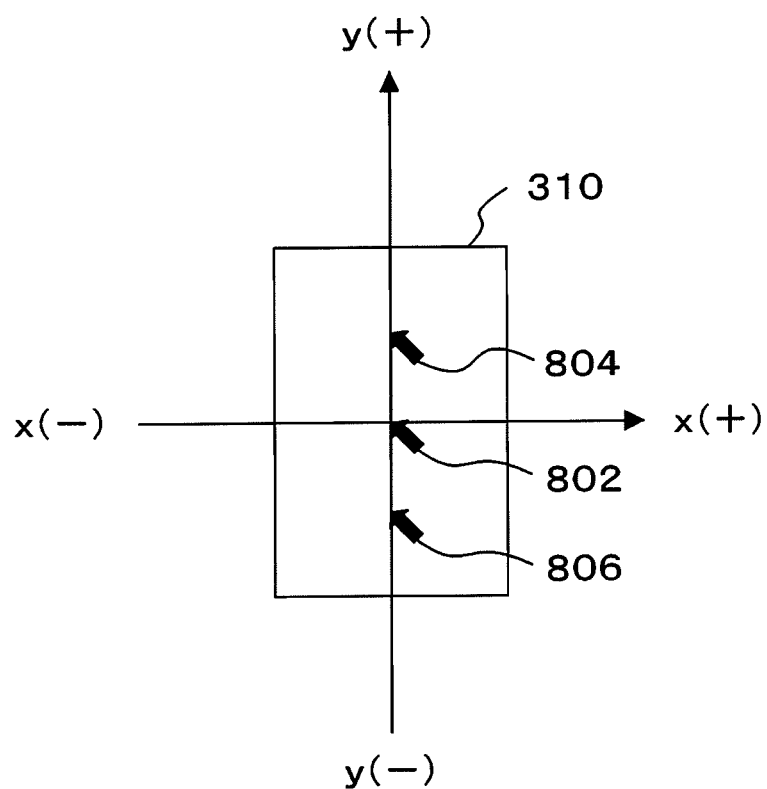
FIG. 8 is a schematic representation to show an example of motion of a cursor in a display screen.

If this state is changed to a state as illustrated in FIG. 7B, namely, the upper part of the portable information processing apparatus 300 is inclined upward away from the operator (the portable information processing apparatus 300 is brought close to a horizontal state), a move is made from the cursor 802 to the position of a cursor 804 as illustrated in FIG. 8. FIG. 7B represents A1$t$ of the angle between projection 704 of the gravity acceleration vector (Tx, Ty, Tz) in the cursor position determination state onto the yz plane and the positive orientation of the z axis. Since A1$t$>A1$s$, the value in parentheses in Expression (1) becomes positive and if M1 is positive, Cy moves in the positive direction.

In addition, in the cases that the portable information processing apparatus 300 is inclined inversely, if this state is changed to a state as illustrated in FIG. 7C, namely, the upper part of the portable information processing apparatus 300 is inclined close to the operator (the portable information processing apparatus 300 is brought close to a vertical state), a move is made from the cursor 802 to the position of a cursor 806 as illustrated in FIG. 8. FIG. 7C represents A1$t$ of the angle between projection 706 of the gravity acceleration vector (Tx, Ty, Tz) in the cursor position determination state onto the yz plane and the positive orientation of the z axis. Since A1$t$<A1$s$, the value in parentheses in Expression (1) becomes negative and if M1 is positive, Cy moves in the negative direction.

At step S210, the cursor x coordinate determination module 132 determines the x coordinate of the cursor.

In more detail, the angle between projection of the gravity acceleration vector (Sx, Sy, Sz) onto the xy plane and the positive orientation of the x axis is found as A2$s$ and the angle between projection of the gravity acceleration vector (Sx, Sy, Sz) onto the xz plane and the positive orientation of the x axis is found as A3$s$. The angle between projection of the gravity acceleration vector (Tx, Ty, Tz) onto the xy plane and the positive orientation of the x axis is found as A2$t$ and the angle between projection of the gravity acceleration vector (Tx, Ty, Tz) onto the xz plane and the positive orientation of the x axis is found as A3$t$. Here, positive and negative of the angle are defined so that the angle from the z axis positive direction to the y axis positive direction and the angle from the x axis positive direction to the z axis positive direction become each positive 90 degrees.

Position Cx of the cursor on the display screen in the x axis direction is found as $$Cx = M2 \times (A2t - A2s) + M3 \times (A3t - A3s) + P2 \qquad \text{Expression (2)}$$

If the position of the cursor is thus found, when the coefficient M2 is a positive value, if the operator inclines the upper part of the portable information processing apparatus 300 to the right, the cursor moves to the right; if the operator inclines the apparatus in an opposite orientation, the cursor moves to the left.

The reason why the projection angles onto the two planes (xy plane and xz plane) are thus used is that the operator may hold the terminal so that the display screen becomes close to vertical orientation to the ground (the size of projection of the gravity acceleration vector to the xz plane lessens) or may hold the terminal so that the display screen becomes close to horizontal orientation to the ground (the size of projection of the gravity acceleration vector to the xy plane lessens).

The values of the coefficients M2 and M3 are as described about the coefficient M1 in the y axis direction. The value of the coefficient P2 is as described about the coefficient P1 in the y axis direction.

Figure 9A:
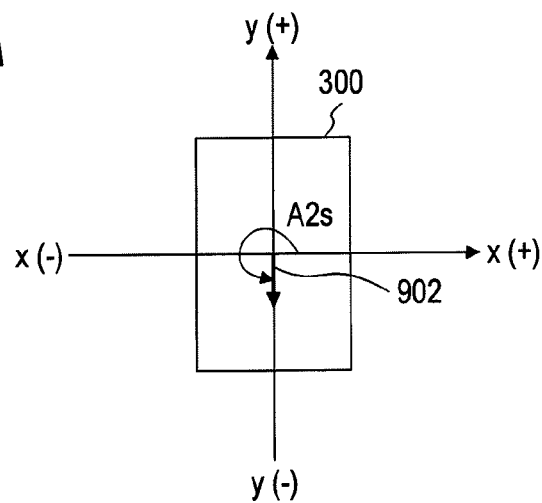
FIGS. 9A, 9B and 9C are schematic representations to show an example of inclination of the portable information processing apparatus in xy plane.
Figure 9B:
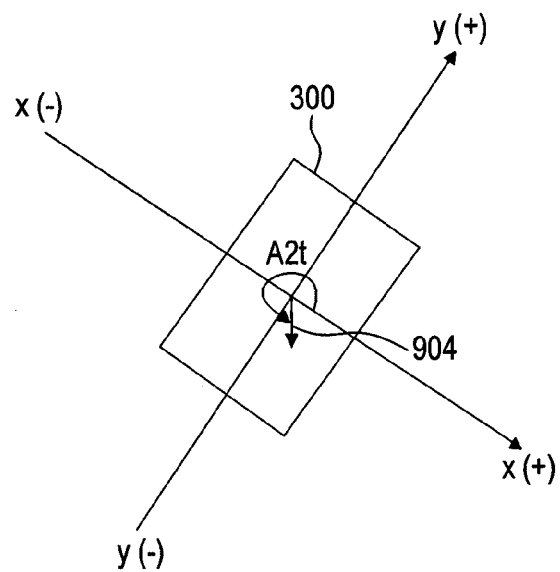
Figure 9C:
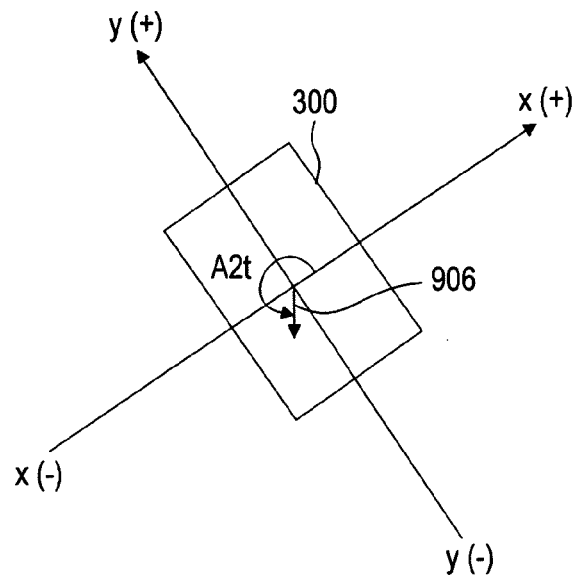

FIGS. 9A to 9C are schematic representations to show an example of inclination of the portable information processing apparatus 300 in the xy plane. FIG. 9A shows an example of the portable information processing apparatus 300 in the stationary state. It represents A2$s$ of the angle between projection 902 of the gravity acceleration vector (Sx, Sy, Sz) in the stationary state onto the xy plane and the positive orientation of the x axis. The position of the cursor in the display screen 310 in this case is a cursor 1002 at the origin as illustrated in FIG. 10.

Figure 10:
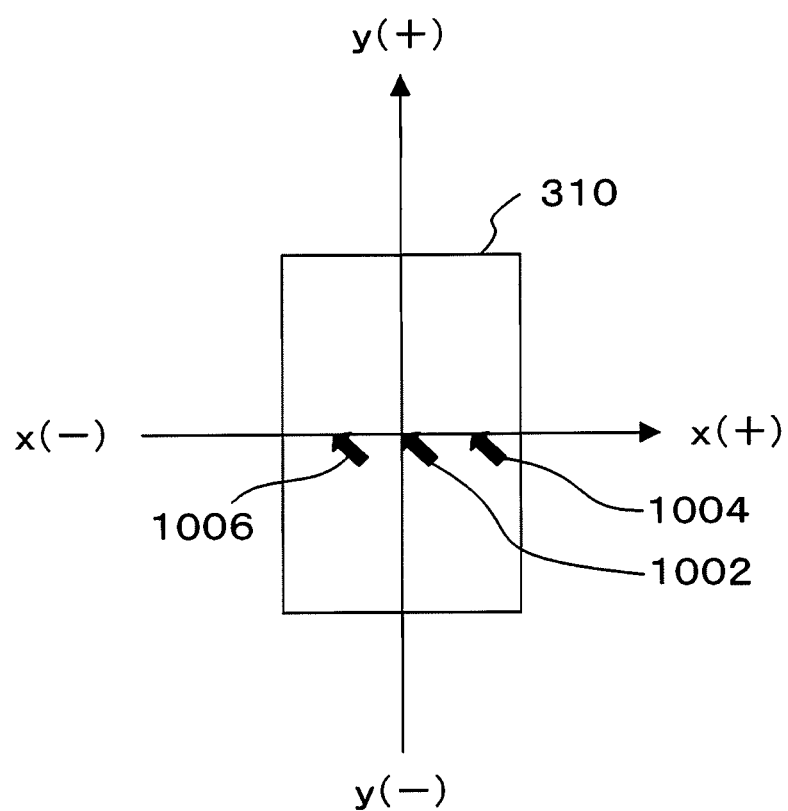
FIG. 10 is a schematic representation to show an example of motion of a cursor in a display screen.

If this state is changed to a state as illustrated in FIG. 9B, namely, the upper part of the portable information processing apparatus 300 is inclined to the right, a move is made from the cursor 1002 to the position of a cursor 1004 as illustrated in FIG. 10. FIG. 9B represents A2$t$ of the angle between projection 904 of the gravity acceleration vector (Tx, Ty, Tz) in the cursor position determination state onto the xy plane and the positive orientation of the x axis. Since A2$t$>A2$s$, the value in the first parentheses in Expression (2) becomes positive and if M2 is positive, Cx moves in the positive direction.

If the apparatus is inclined oppositely and a state as illustrated in FIG. 9C is set, namely, if the upper part of the portable information processing apparatus 300 is inclined to the left, a move is made from the cursor 1002 to the position of a cursor 1006 as illustrated in FIG. 10. FIG. 9C represents A2$t$ of the angle between projection 906 of the gravity acceleration vector (Tx, Ty, Tz) in the cursor position determination state onto the xy plane and the positive orientation of the x axis. Since A2$t$<A2$s$, the value in the first parentheses in Expression (2) becomes negative and if M2 is positive, Cx moves in the negative direction.

Figure 11A:
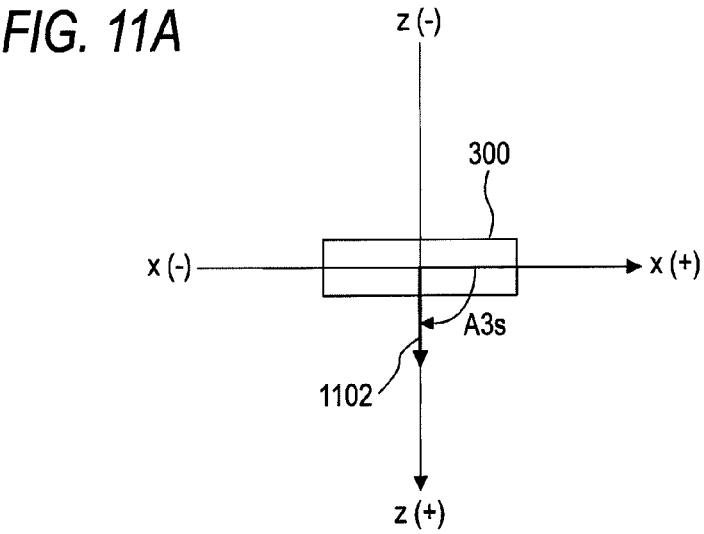
FIGS. 11A, 11B and 11C are schematic representations to show an example of inclination of the portable information processing apparatus in xz plane.
Figure 11B:
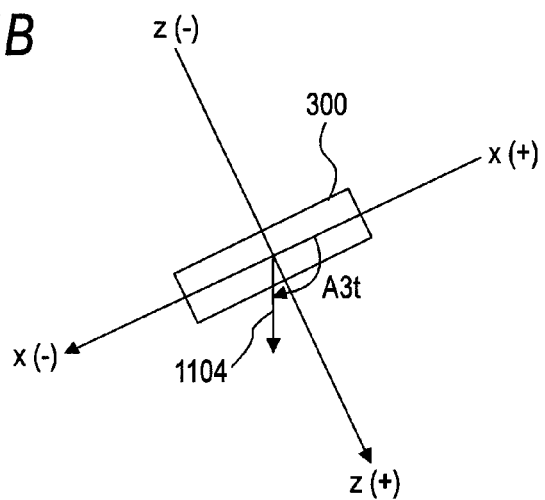
Figure 11C:
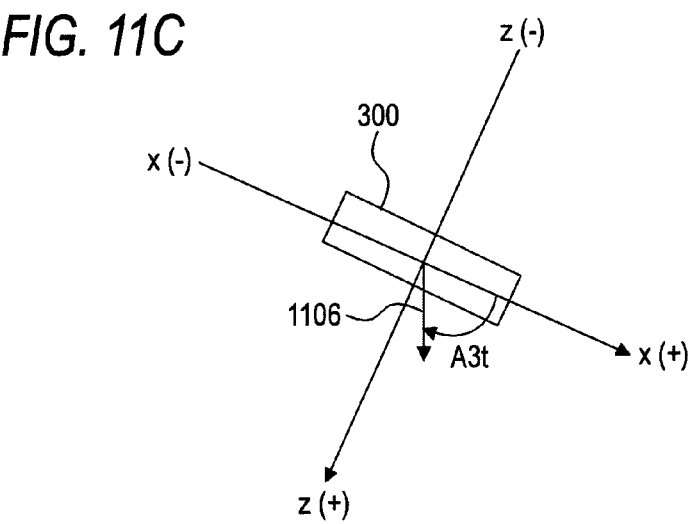

FIGS. 11A to 11C are schematic representations to show an example of inclination of the portable information processing apparatus 300 in the xz plane. FIG. 11A shows an example of the portable information processing apparatus 300 in the stationary state. It represents A3$s$ of the angle between projection 1102 of the gravity acceleration vector (Sx, Sy, Sz) in the stationary state onto the xz plane and the positive orientation of the x axis. The position of the cursor in the display screen 310 in this case is the cursor 1002 at the origin as illustrated in FIG. 10.

If this state is changed to a state as illustrated in FIG. 11B, namely, the right side of the portable information processing apparatus 300 is rotated to the back (if the right side of the portable information processing apparatus 300 is rotated away from the operator), a move is made from the cursor 1002 to the position of the cursor 1004 as illustrated in FIG. 10. FIG. 11B represents A3t of the angle between projection 1104 of the gravity acceleration vector (Tx, Ty, Tz) in the cursor position determination state onto the xz plane and the positive orientation of the x axis. Since A3t>A3s, the value in the second parentheses in Expression (2) becomes positive and if M3 is positive, Cx moves in the positive direction.

If the apparatus is inclined oppositely and a state as illustrated in FIG. 11C is set, namely, if the left side of the portable information processing apparatus 300 is rotated to the back (if the left side of the portable information processing apparatus 300 is rotated away from the operator), a move is made from the cursor 1002 to the position of the cursor 1006 as illustrated in FIG. 10. FIG. 11C represents A3t of the angle between projection 1106 of the gravity acceleration vector (Tx, Ty, Tz) in the cursor position determination state onto the xz plane and the positive orientation of the x axis. Since A3t<A3s, the value in the second parentheses in Expression (2) becomes negative and if M3 is positive, Cx moves in the negative direction.

If the size of the projection of the gravity acceleration vector (Sx, Sy, Sz) or the gravity acceleration vector (Tx, Ty, Tz) onto the xy plane is smaller than a predetermined value, fluctuation of the angle on the xy plane is ignored and Cx may be found as $$Cx = M3 \times (A3t - A3s) + P2 \qquad \text{Expression (3)}$$

This is equivalent to calculation with the value of the coefficient M2 in Expression (2) as 0. By so doing, if the size of the projection of the acceleration vector onto the xy plane is small, the angle on the xy plane can largely change because of an error component and thus operation not intended by the operator is prevented from occurring.

Likewise, if the size of the projection of the gravity acceleration vector (Sx, Sy, Sz) or the gravity acceleration vector (Tx, Ty, Tz) onto the xz plane is smaller than a predetermined value, fluctuation of the angle on the xz plane is ignored and Cx may be found as $$Cx = M2 \times (A2t - A2s) + P2 \qquad \text{Expression (4)}$$

This is equivalent to calculation with the value of the coefficient M3 in Expression (2) as 0. By so doing, if the size of the projection of the acceleration vector onto the xz plane is small, the angle on the xz plane can largely change because of an error component and thus operation not intended by the operator is prevented from occurring.

At step S212, the cursor display module 122 determines whether or not to display a cursor. If the cursor is displayed, the process goes to step S214; otherwise, the process goes to step S216. This determination conforms to display or non-display switched by the cursor display switch module 124.

At step S214, the cursor display module 122 displays the cursor on the display screen 102.

At step S216, processing responsive to the cursor position is performed. For example, if it is detected that the cursor moves to a predetermined button area, the display method of the button area is changed for highlighting the button clickable or temporarily displaying the description of the button.

At step S218, the touch position is detected and whether or not touch operation is started is determined. If touch operation is started, the process goes to step S220; otherwise, the process goes to step S299 (end).

At step S220, the position correction module 126 corrects the touch position using the cursor position determined at steps S208 and S209 and the touch position detected at step S218.

At step S222, processing responsive to the touch position is performed. For example, if the touch is short-time touch, click operation is assumed to be performed, and if the touch position is within the area of a button, processing assigned to the button is performed.

Figure 12:
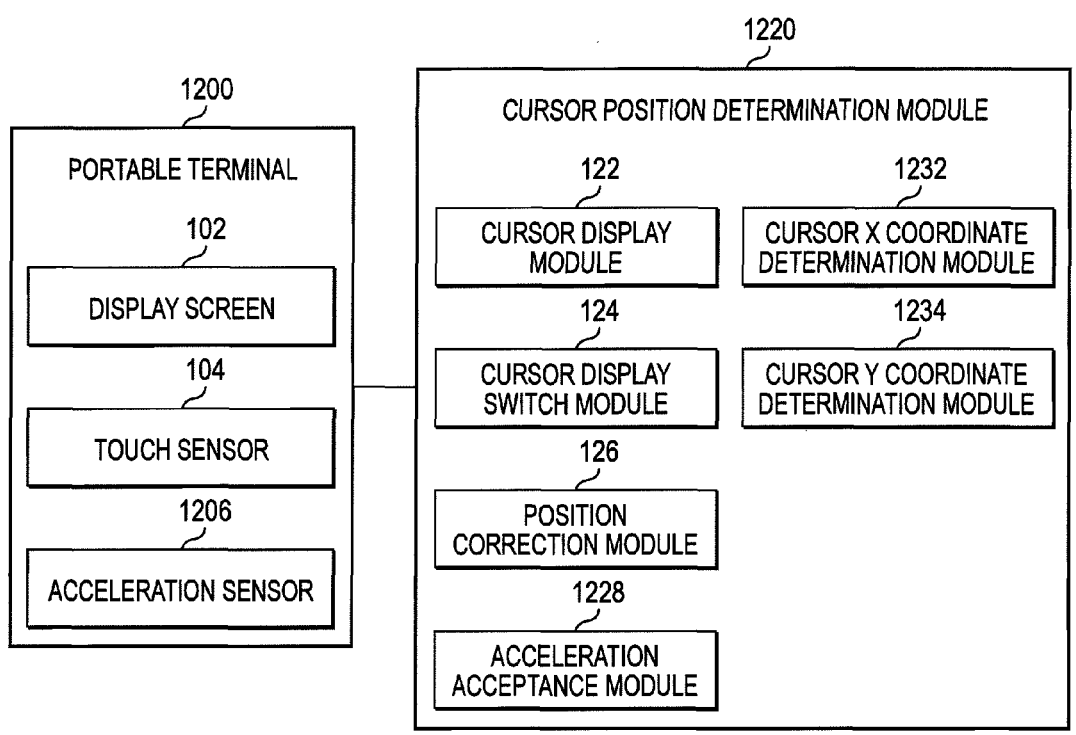
FIG. 12 is a conceptual module block diagram about a configuration example of a second embodiment of the invention.

FIG. 12 is a conceptual module block diagram about a configuration example of a second embodiment of the invention.

An information processing apparatus of the second embodiment is a portable information processing apparatus having a display screen and has a portable terminal 1200 and a cursor position determination module 1220 as shown in an example in FIG. 12. The portable terminal 1200 and the cursor position determination module 1220 are connected. Parts similar to those of the first embodiment are denoted by the same reference numerals and will not be discussed again. The portable terminal 1200 corresponds to the portable terminal 100 of the first embodiment and the cursor position determination module 1220 corresponds to the cursor position determination module 120 of the first embodiment. The description of FIGS. 3 to 6 also applies to the second embodiment.

In the second embodiment, acceleration of the portable information processing apparatus is used to determine the cursor position.

The portable terminal 1200 has a display screen 102, a touch sensor 104, and an acceleration sensor 1206.

The acceleration sensor 1206 is a device for detecting acceleration of the portable terminal 1200 and corresponds to the portion for detecting the acceleration of the inclination or acceleration sensor 106 of the first embodiment. For example, if a three-axis acceleration sensor is included, the acceleration is detected as a three-dimensional vector.

The acceleration based on gravity is a value detected by the acceleration sensor 1206 when a portable information processing apparatus 300 is almost still or moves at fixed speed. For example, when the acceleration observed within a determined time is within a predetermined range, the detected acceleration is assumed to be gravity acceleration and the difference between the acceleration observed at one later time and the gravity acceleration can be assumed to be acceleration based on motion of the portable information processing apparatus 300 (the operator moves the portable information processing apparatus 300 by shaking, etc.,). The acceleration vector thus found is (Ax, Ay, Az).

The cursor position determination module 1220 has a cursor display module 122, a cursor display switch module 124, a position correction module 126, an acceleration acceptance module 1228, a cursor x coordinate determination module 1232, and a cursor y coordinate determination module 1234.

The acceleration acceptance module 1228 accepts acceleration in the up and down direction and the left-right direction of the portable terminal 1200 and accepts the acceleration vector (Ax, Ay, Az), The cursor x coordinate determination module 1232 determines the x coordinate of a cursor on the display screen 102 based on the sum of acceleration in the up and down direction accepted by the acceleration acceptance module 1228 in a predetermined time period.

The x coordinate of the cursor on the display screen 102 at time t is found as $$Cx = Mx \times \int p(Ax, Fx) dt + Dx \qquad \text{Expression (5)}$$

The cursor y coordinate determination module 1234 determines the y coordinate of the cursor on the display screen 102 based on the sum of acceleration in the left-right direction accepted by the acceleration acceptance module 1228 in a predetermined time period.

The y coordinate of the cursor on the display screen 102 at time t is found as $$Cy = My \times \int p(Ay, Fy) dt + Dy \quad \text{Expression (6)}$$

Here, ∫dt represents time integration, but the acceleration sensor 1206 often detects acceleration at predetermined time intervals and thus an approximate value may be found according to the total value of the values at the times.

Function p (a, b) is a function defined as $$p(a,b) = a + b \ (a \leq -b) \quad \text{Expression (7)}$$

$$p(a,b) = 0 \ (a > -b \text{ and } a < b) \quad \text{Expression (8)}$$

$$p(a,b) = a - b \ (a \geq b) \quad \text{Expression (9)}$$

The coordinates of the cursor are determined according to the function P (a, b), whereby when the absolute value of the acceleration of the portable information processing apparatus 300 is small (smaller than Fx, Fy), the cursor coordinates do not change and a move of the cursor not intended by the operator because of minute vibration or measurement error can be prevented. When the apparatus is shaken in faster operation than some extent, the cursor moved and as the apparatus is shaken faster, the move distance of the cursor becomes larger. As the constant Fx, Fy is larger, erroneous operation caused by vibration, etc., lessens; on the other hand, fast operation becomes necessary to obtain the same cursor move distance. The coefficient Mx, My determines how much the cursor is to be moved in response to the magnitude of the acceleration. The values of Fx, Fy, Mx, and My may be predetermined values for the portable information processing apparatus 300, may be changed in response to setting of the operator, or may be changed dynamically in response to the operation being performed. Dx and Dy are the immediately preceding x and y coordinates of the cursor.

Figure 13:
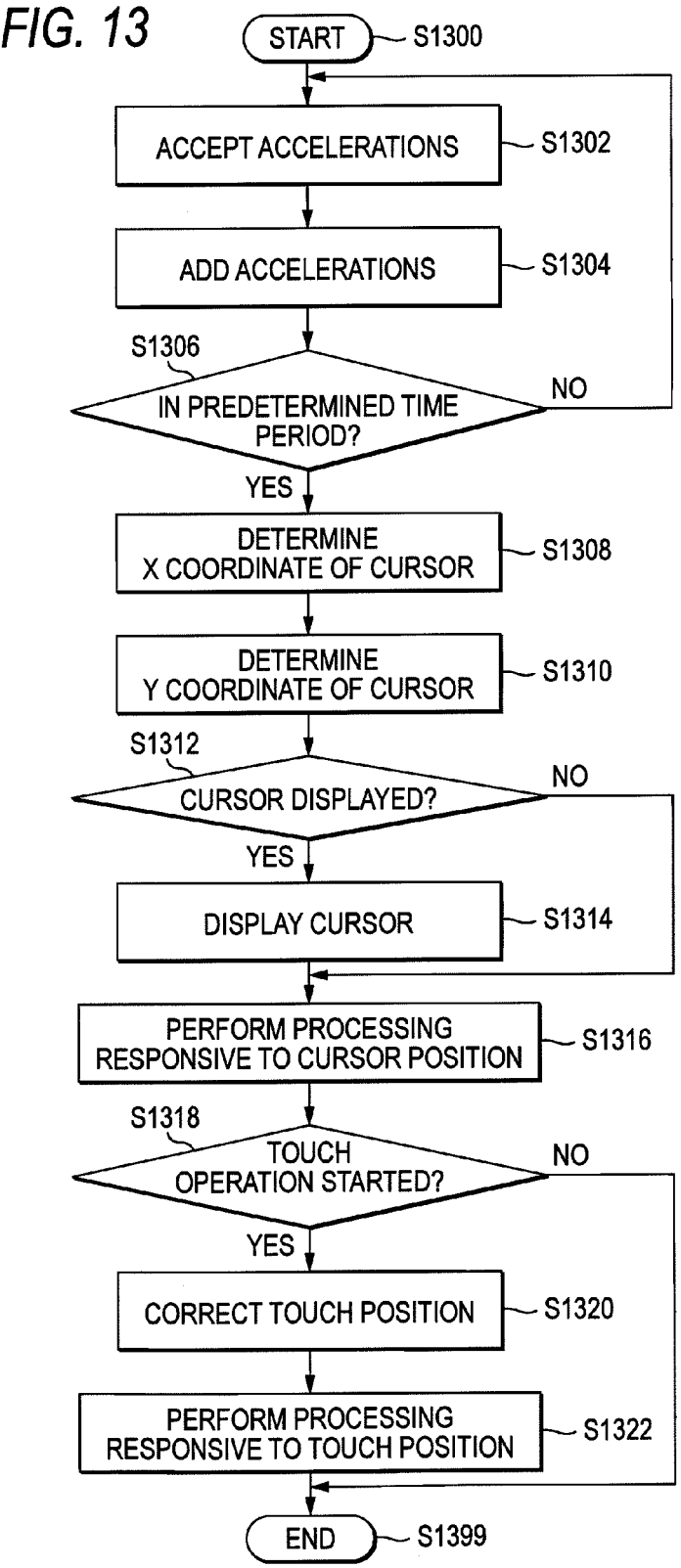
FIG. 13 is a flowchart to show a processing example according to the second embodiment of the invention.

FIG. 13 is a flowchart to show a processing example according to the second embodiment of the invention.

At step S1302, the acceleration acceptance module 1228 accepts acceleration detected by the acceleration sensor 1206.

At step S1304, the acceleration acceptance module 1228 adds the acceleration in the x axis direction and the acceleration in the y axis direction. The values based on p (Ax, Fx) and p (Ay, Fy) may be added.

At step S1306, the acceleration acceptance module 1228 determines whether or not the time period is a predetermined time period. If the time period is the predetermined time period, the process goes to step S1308; otherwise, the process returns to S1302. That is, at steps S1302 and S1304, ∫p (Ax, Fx) dt and ∫p (Ay, Fy) dt are calculated.

At step S1308, the cursor x coordinate determination module 1232 determines the x coordinate of the cursor according to Expression (5).

At step S1310, the cursor y coordinate determination module 1234 determines the y coordinate of the cursor according to Expression (6).

At step S1312, the cursor display module 122 determines whether or not to display the cursor. If the cursor is displayed, the process goes to step S1314; otherwise, the process goes to step S1316. This determination conforms to display or non-display switched by the cursor display switch module 124.

At step S1314, the cursor display module 122 displays the cursor on the display screen 102.

At step S1316, processing responsive to the cursor position is performed. For example, if it is detected that the cursor moves to a predetermined button area, the display method of the button area is changed for highlighting the button clickable or temporarily displaying the description of the button.

At step S1318, the touch position is detected and whether or not touch operation is started is determined. If touch operation is started, the process goes to step S1320; otherwise, the process goes to step S1399 (end).

At step S1320, the position correction module 126 corrects the touch position using the cursor position determined at steps S1308 and S1310 and the touch position detected at step S1318.

At step S1322, processing responsive to the touch position is performed. For example, if the touch is short-time touch, click operation is assumed to be performed, and if the touch position is within the area of a button, processing assigned to the button is performed.

Figure 14:
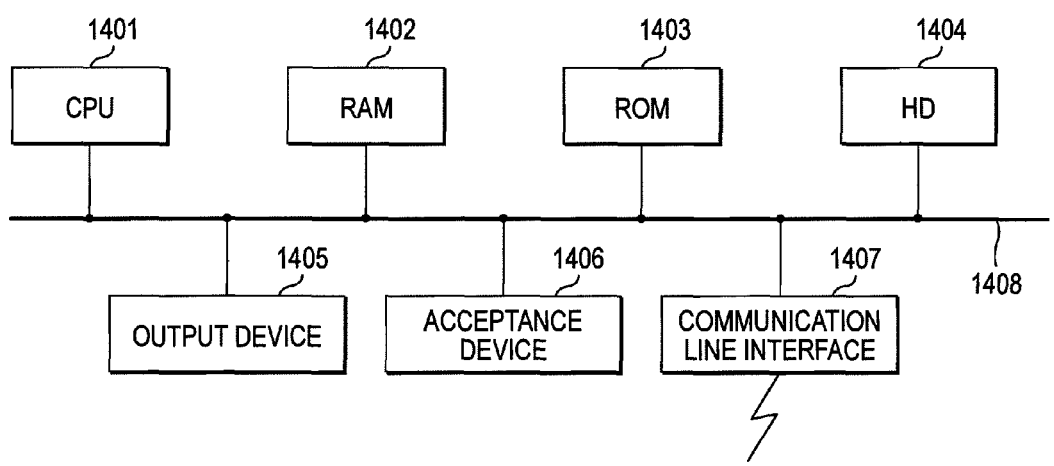
FIG. 14 is a block diagram to show a hardware configuration example of a computer for realizing the embodiment of the invention.

The hardware configuration of the computer for executing the program as the embodiment (the portable information processing apparatus 300, the Web server 410, etc.,) is a general computer as illustrated in FIG. 14 and specifically is a computer, etc., which can become a portable personal computer (in the case of the portable information processing apparatus 300) or a server (in the case of the Web server 410). That is, as a specific example, a CPU 1401 is used as a processing section (computation section) and RAM 1402, ROM 1403, and HD 1404 are used as storage. For example, a hard disk may be used as the HD 1404. The apparatus (computer) is made up of the CPU 1401 for executing the programs of the cursor display module 122, the cursor display switch module 124, the position correction module 126, the inclination or acceleration acceptance module 128, the stationary state determination module 130, the cursor x coordinate determination module 132, the cursor y coordinate determination module 134, the acceleration acceptance module 1228, the cursor x coordinate determination module 1232, the cursor y coordinate determination module 1234, etc., the RAM 1402 for the storing the programs and data, the ROM 1404 storing a program for starting the computer and the like, the HD 1404 of auxiliary storage, an acceptance device 1406 for accepting data based on operation of the user for the touch panel, etc., an output device 1405 of a liquid crystal display, etc., a communication line interface 1407 for connecting to a communication network, such as a network interface, and a bus 1408 for connecting them and transferring data. The computers may be connected by a network.

For the parts based on the computer programs in the embodiment described above, the computer programs of software are read into the system of the hardware configuration and the software and hardware resources work in cooperation, thereby implementing the embodiment described above.

The hardware configuration shown in FIG. 14 shows one configuration example and the embodiment is not limited to the configuration in FIG. 14 and any configuration may be adopted if it makes it possible to execute the modules described in the embodiment. For example, some modules may be implemented as dedicated hardware (for example, an ASIC, etc.,) and some modules may be included in an external system and may be connected via a communication line and further a plurality of systems shown in FIG. 14 may be connected via a communication line so as to operate in cooperation with each other.

The portable information processing apparatus 300 may be implemented as a PDA (Personal Digital Assistant), a mobile telephone, a portable gaming machine, a portable music player, etc.

The various embodiments described above may be combined (for example, a module in one embodiment is applied to another embodiment, modules in the embodiments are exchanged, etc.,) and the arts described in [Background Arts] may be adopted as the processing of each module.

The described program may be provided as it is stored on a record medium or the program may be provided by communication means. In this case, for example, the described program may be grasped as the invention of a computer-readable record medium recording a program."

The expression "computer-readable record medium recording a program" is used to mean a record medium that can be read by a computer where a program is recorded, used to install and execute the program, to distribute the program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), Blue-ray disc (registered trademark), magneto-optical disk (MO), flexible disk (FD), magnetic tape, hard disk, read-only memory (ROM), electrically erasable and programmable read-only memory (EEPROM) (registered trademark), flash memory, random access memory (RAM), etc., for example.

The above-described program or a part thereof may be recorded in any of the described record media for retention, distribution, etc. The above-described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the above-described program may be a part of another program or may be recorded in a record medium together with a different program. The program may be recorded as it is divided into a plurality of record media. The program may be recorded in any mode if it can be restored, such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first acceptance unit that accepts first inclinations or first accelerations of a portable information processing apparatus having a display screen in a first state;
    a second acceptance unit that accepts second inclinations or second accelerations of the information processing apparatus in a second state; and
    a coordinate determination unit that determines coordinates of a mark for pointing to a position on the display screen in the second state based on the first inclinations accepted by the first acceptance unit and the second inclinations accepted by the second acceptance unit or based on the first accelerations accepted by the first acceptance unit and the second accelerations accepted by the second acceptance unit,
    wherein
    the display screen includes an x axis and a y axis on a display screen surface, the x axis and the y axis being orthogonal to each other,
    a z axis are perpendicular to the display screen surface,
    each of the first and second inclinations and the first and second accelerations includes a value in each of the x axis, the y axis, and the z axis of the display screen,
    the coordinate determination unit determines the coordinates in an up and down direction on the display screen surface based on the angle difference between projection of the first inclinations onto a yz plane and projection of the second inclinations onto the yz plane or based on the angle difference between projection of the first accelerations onto the yz plane and projection of the second accelerations onto the yz plane,
    the coordinate determination unit determines the coordinates in a left-right direction on the display screen surface based on the angle difference between projection of the first inclinations onto a xy plane and projection of the second inclinations onto the xy plane or based on the angle difference between projection of the first accelerations onto the xy plane and projection of the second accelerations onto the xy plane, and
    the coordinate determination unit determines the coordinates in the left-right direction on the display screen surface based on the angle difference between projection of the first inclinations onto a xz plane and projection of the second inclinations onto the xz plane or based on the angle difference between projection of the first accelerations onto the xz plane and projection of the second accelerations onto the xz plane.

2. The information processing apparatus according to claim 1, wherein
    the coordinate determination unit compares the size of the projection of the first inclinations or the first accelerations onto the xy plane or the projection of the second inclinations or the second accelerations onto the xy plane with a predetermined threshold value, and
    if the first or second inclinations and the predetermined threshold value have a predetermined relationship or if the first or second accelerations and the predetermined threshold value have a predetermined relationship, the coordinate determination unit determines the coordinates in the left-right direction on the display screen surface based on the angle difference between the projection of the first inclinations onto the xz plane and projection of the second inclinations onto the xz plane or based on the angle difference between the projection of the first accelerations onto the xz plane and projection of the second accelerations onto the xz plane.

3. The information processing apparatus according to claim 1, wherein
    the coordinate determination unit compares the size of the projection of the first inclinations or the first accelerations onto the xz plane or the projection of the second inclinations or the second accelerations onto the xz plane with a predetermined threshold value, and if the first or second inclinations and the predetermined threshold value have a predetermined relationship or if the first or second accelerations and the predetermined threshold value have a predetermined relationship, the coordinate determination unit determines the coordinates in the left-right direction on the display screen surface based on the angle difference between the projection of the first inclinations onto the xy plane and projection of the second inclinations onto the xy plane or based on the angle difference between the projection of the first accelerations onto the xy plane and projection of the second accelerations onto the xy plane.

4. The information processing apparatus according to claim 1, further comprising:
a display unit that displays the mark at the position of the coordinates on the display screen determined by the coordinate determination unit.

5. The information processing apparatus according to claim 4, further comprising:
a display switch unit that switches display and non-display of the mark by the display unit.

6. The information processing apparatus according to claim 1, further comprising:
an operation position acceptance unit that accepts a position of operation performed by an operator for the display screen; and
a position change unit that compares a distance between the position accepted by the operation position acceptance unit and the position determined by the coordinate determination unit with a predetermined threshold value and that changes the position accepted by the operation position acceptance unit or the position determined by the coordinate determination unit.

7. An information processing apparatus comprising:
a acceptance unit that accepts accelerations of a portable information processing apparatus having a display screen in an up and down direction and a left-right direction on a display screen surface; and
a coordinate determination unit that determines coordinates of a mark for pointing to a position on the display screen based on the sum of accelerations in the up and down direction and the sum of accelerations in the left-right direction accepted by the acceptance unit in a predetermined time period,
wherein
the display screen includes an x axis and a y axis on a display screen surface, the x axis and the y axis being orthogonal to each other,
a z axis are perpendicular to the display screen surface,
each of the first and second inclinations and the first and second accelerations includes a value in each of the x axis, the y axis, and the z axis of the display screen,
the coordinate determination unit determines the coordinates in an up and down direction on the display screen surface based on the angle difference between projection of the first inclinations onto a yz plane and projection of the second inclinations onto the yz plane or based on the angle difference between projection of the first accelerations onto the yz plane and projection of the second accelerations onto the yz plane,
the coordinate determination unit determines the coordinates in a left-right direction on the display screen surface based on the angle difference between projection of the first inclinations onto a xy plane and projection of the second inclinations onto the xy plane or based on the angle difference between projection of the first accelerations onto the xy plane and projection of the second accelerations onto the xy plane, and
the coordinate determination unit determines the coordinates in the left-right direction on the display screen surface based on the angle difference between projection of the first inclinations onto a xz plane and projection of the second inclinations onto the xz plane or based on the angle difference between projection of the first accelerations onto the xz plane and projection of the second accelerations onto the xz plane.

8. A non-transitory computer-readable medium storing a program that causes a computer to execute information processing, the information processing comprising:
accepting first inclinations or first accelerations of a portable information processing apparatus having a display screen in a first state;
accepting second inclinations or second accelerations of the information processing apparatus in a second state; and
determining coordinates of a mark for pointing to a position on the display screen in the second state based on the first accepted inclinations and the second accepted inclinations or based on the first accepted accelerations and the second accepted accelerations,
wherein
the display screen includes an x axis and a y axis on a display screen surface, the x axis and the y axis being orthogonal to each other,
a z axis are perpendicular to the display screen surface,
each of the first and second inclinations and the first and second accelerations includes a value in each of the x axis, the y axis, and the z axis of the display screen,
determining the coordinates in an up and down direction on the display screen surface based on the angle difference between projection of the first inclinations onto a yz plane and projection of the second inclinations onto the yz plane or based on the angle difference between projection of the first accelerations onto the yz plane and projection of the second accelerations onto the yz plane,
determining the coordinates in a left-right direction on the display screen surface based on the angle difference between projection of the first inclinations onto a xy plane and projection of the second inclinations onto the xy plane or based on the angle difference between projection of the first accelerations onto the xy plane and projection of the second accelerations onto the xy plane, and
determining the coordinates in the left-right direction on the display screen surface based on the angle difference between projection of the first inclinations onto a xz plane and projection of the second inclinations onto the xz plane or based on the angle difference between projection of the first accelerations onto the xz plane and projection of the second accelerations onto the xz plane.

9. A non-transitory computer-readable medium storing a program that causes a computer to execute information processing, the information processing comprising:
accepting accelerations of a portable information processing apparatus having a display screen in an up and down direction and a left-right direction on a display screen surface;
determining coordinates of a mark for pointing to a position on the display screen based on the sum of the accepted accelerations in the up and down direction and the sum of the accepted accelerations in the left-right direction in a predetermined time period,
wherein the display screen includes an x axis and a y axis on a display screen surface, the x axis and the y axis being orthogonal to each other, a z axis are perpendicular to the display screen surface, each of the first and second inclinations and the first and second accelerations includes a value in each of the x axis, the y axis, and the z axis of the display screen, determining the coordinates in an up and down direction on the display screen surface based on the angle difference between projection of the first inclinations onto a yz plane and projection of the second inclinations onto the yz plane or based on the angle difference between projection of the first accelerations onto the yz plane and projection of the second accelerations onto the yz plane, determining the coordinates in a left-right direction on the display screen surface based on the angle difference between projection of the first inclinations onto a xy plane and projection of the second inclinations onto the xy plane or based on the angle difference between projection of the first accelerations onto the xy plane and projection of the second accelerations onto the xy plane, and determining the coordinates in the left-right direction on the display screen surface based on the angle difference between projection of the first inclinations onto a xz plane and projection of the second inclinations onto the xz plane or based on the angle difference between projection of the first accelerations onto the xz plane and projection of the second accelerations onto the xz plane.

\* \* \* \* \*